(12) United States Patent
Rubtsov (10) Patent No.: US 6,283,327 B1
(45) Date of Patent: Sep. 4, 2001

(54) MATERIAL FEED SYSTEM FOR SELECTIVELY DELIVERING LIGHTWEIGHT, FRIABLE MESH FIBERS

(75) Inventor: Yuriy Rubtsov, Aurora, CO (US)

(73) Assignee: Insulation Technology Corporation, Broomfield, CO (US)

( * ) Notice: Subject to any disclaimer, the term of this patent is extended or adjusted under 35 U.S.C. 154(b) by 0 days.

(21) Appl. No.: 09/548,101

(22) Filed: Apr. 12, 2000

(51) Int. Cl.$^7$ .................................................. B67D 5/08
(52) U.S. Cl. ........................... 222/56; 222/168; 222/630; 222/368
(58) Field of Search ............................ 222/56, 167, 168, 222/181.2, 630, 342, 368

(56) References Cited

U.S. PATENT DOCUMENTS

| | | | |
|---|---|---|---|
| 354,940 | * 12/1886 | Sharpneck | 222/168 |
| 2,781,952 | * 2/1957 | Mahoney | 222/168 |
| 3,027,049 | * 3/1962 | Roffelsen | 222/168 |
| 3,245,590 | * 4/1966 | Hawkins | 222/630 X |
| 3,822,866 | 7/1974 | Daester et al. | 259/149 |
| 4,092,737 | 5/1978 | Sandell | 366/3 |
| 4,215,956 | 8/1980 | Reba | 406/152 |
| 4,379,664 | * 4/1983 | Klein et al. | 222/630 X |
| 4,619,531 | 10/1986 | Dunstan | 366/3 |
| 4,695,206 | 9/1987 | Hansen | 406/65 |
| 5,054,657 | * 10/1991 | Morse et al. | 222/167 X |
| 5,407,139 | 4/1995 | Meleczewski | 241/18 |
| 5,775,852 | 7/1998 | Boutte et al. | 406/32 |
| 5,829,649 | 11/1998 | Horton | 222/636 |
| 5,855,671 | * 1/1999 | Scherping et al. | 222/630 X |
| 6,073,818 | * 6/2000 | Rothenberg et al. | 222/630 X |

FOREIGN PATENT DOCUMENTS

| | | |
|---|---|---|
| 0 499 572 A1 | 8/1992 | (EP) . |
| 460 620 | 9/1968 | (FR) . |

* cited by examiner

Primary Examiner—Kenneth Bomberg
(74) Attorney, Agent, or Firm—Thomas C. Folsom; Chrisman Bynum & Johnson (57) ABSTRACT

A material feed system and method for conveying a metered quantity of lightweight, friable mesh fibers without minimal damage to the mesh fibers to concrete and like materials mixing tank. The material feed system including a hopper with a spiral fiber guide near the discharge and flexible blades for clearing fibers from the upper and lower surfaces of the spiral fiber guide. A drive assembly is included for rotating the hopper at a rotation rate adequate to move and agitate the mesh fibers to facilitate flow of the mesh fibers first outward against the side walls of the bin and then rapidly downward through the bin being guided by the spiral fiber guide. To convey the fibers from the hopper outlet to the mixing tank with minimal damage, the material feed system includes a vacuum conveyor assembly comprising an air inlet and a vacuum conveyor conduit in which a vacuum is created by a venturi aspirator and blower to draw the fibers from the hopper outlet through the vacuum conveyor conduit in a compact state to minimize damage to fibrils of the mesh fibers. To meter the fibers fed into the hopper, a metered feed assembly is used that includes a feed drum with an inlet-outlet opening, a device for slowly rotating the feed drum, and a feed bin that stores inputted mesh fibers. When the feed drum is rotated, fibers from the feed bin enter the feed drum when the inlet-outlet opening is directed upward, and the fibers are dispensed to the hopper when the inlet-outlet opening is directed downward.

24 Claims, 6 Drawing Sheets

MATERIAL FEED SYSTEM FOR SELECTIVELY DELIVERING LIGHTWEIGHT, FRIABLE MESH FIBERS

BACKGROUND OF THE INVENTION

1. Field of the Invention

The present invention relates generally to a method and apparatus for delivering materials to mixing or processing bins, and more particularly, to a method and apparatus for delivering a measured or metered amount of lightweight, friable (i.e., easily torn or otherwise damaged) mesh fibers including a rotatable intake hopper with an inner spiral guide, stationary flexible blades to facilitate movement of fibers on the upper and lower surfaces of the spiral guide, stationary blades for controlling the formation of bridges and clumps of the fibers, and a vacuum-based delivery portion at the outlet of the hopper that work in combination to minimize tearing or otherwise damaging the delivered fibers and to control clogging and binding in the hopper.

2. Description of the Related Art

It is a growing trend in the construction and structural prefabrication industries to reinforce concrete, and similar materials, by adding a known amount of synthetic mesh fibers during the initial mixing or production of the concrete. The addition of specific quantities of these mesh fibers has proven useful for inhibiting shrinkage cracking, increasing impact capacity, reducing permeability, and providing other improvements in the physical characteristics of the end product fabricated from the reinforced concrete. Typically, it is desirable to add somewhere between a ¼ pound and 10 pounds of the mesh fibers per cubic yard of concrete. Due to the lightness of the mesh fibers, this range of weights of mesh fibers represents a relatively large volume of the mesh fibers which must be accurately measured and transported to achieve the desired ratio of mesh fibers to other concrete components. Unfortunately, prior to the present invention, the delivery of a specific amount of undamaged mesh fibers has caused the construction and structural prefabrication industries a number of serious problems.

Figure 1A:
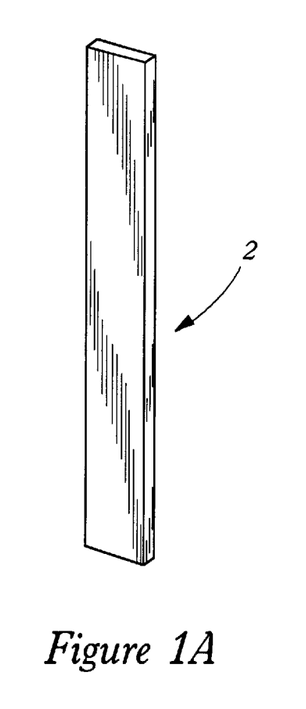
FIG. 1A is a perspective view of a mesh fiber conveyed by the present invention.
Figure 1B:
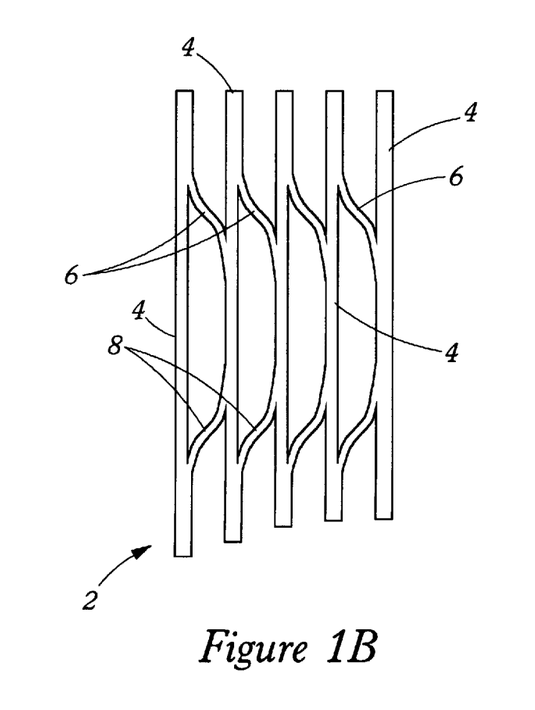
FIG. 1B is a front view of the mesh fiber of FIG. 1A ready for mixing, i.e., in an expanded state.

One problem that these industries face is delivering the mesh fibers to the concrete mixing tank without damaging the mesh fibers such that the mesh fibers are not effective as a reinforcing additive. In this regard, FIGS. 1A and 1B illustrate, respectively, a commonly used synthetic mesh fiber 2, as disclosed in U.S. Pat. No. 5,456,752 of Hogan, in a compact state and in an expanded state. The expanded state is desired during mixing to enhance mixing with cement, line, aggregate, and other materials used in forming the reinforced concrete because these materials fill the spaces in the mesh fiber 2 and better bond with the mesh fiber 2. In the expanded state of the mesh fiber 2, the main fibrils 4 and side fibrils or members 6, 8 and the spaces are clearly visible, and for the mesh fibers to be effective as an additive, it is important that the main and side fibrils 4, 6, and 8 remain intact and that the side fibrils 6, 8 remain attached to the main fibrils 4. The fibers are typically fabricated from lightweight materials such as polypropylene, polyethylene, polyester, polyvinyl chloride, and polyamides with very fine (e.g., 360 to 2600 deniers and a thickness of 0.0001 to 0.01 inches) main and side fibrils 4, 6, and 8 with a length of 0.4 to 1.5 inches and a width of 0.05 to 0.3 inches. Consequently, delivering the mesh fibers without damage is difficult because the mesh fibers are relatively fragile and friable.

Another problem these industries face is how to provide a metered or measured quantity of the mesh fibers. The mesh fibers are small in size and very lightweight. The use of a simple gravity feed hopper is ineffective because the weight of the fibers themselves is not enough to overcome friction that develops between the fibers and between the fibers and the sides of the hopper, and the hopper typically becomes clogged with fiber. U.S. Pat. No. 5,775,852 of Boutte et al. discloses a system that utilizes load cells to measure quantities of dry bulk powder removed from containers and then delivered with a vacuum pump to a mixing bin, but Boutte et al. appears to rely on gravity acting on the dry powder material along with a vacuum force to remove powder from the material containers. However, this system would be less effective for a lightweight material such as the mesh fibers for which gravity forces are not as great as friction forces between the fibers and would most likely result in a very slow dispensing process and/or clogging in the discharge hopper. In practice, the tendency of the mesh fibers to cling to adjacent fibers is large enough that without agitation of the fibers the fibers tend to bind together forming clumps that bind to adjacent surfaces creating binding and bridges or levels of fibers that are strong enough to resist gravity forces.

U.S. Pat. No. 5,407,139 of Mleczewski and U.S. Pat. No. 5,829,649 of Horton each teach systems for delivering insulation material. However, these systems teach the use of screens, augers, shafts, and the like for forcing the material downward in a bin or hopper and also for agitating and separating the material. The systems disclosed by Mleczewski and Horton would be ineffective for mesh fibers 2, shown in FIGS. 1A and 1B, because the fibers 2 are so fine and lightweight that internally rotating augers and paddles merely churn the mesh fibers and become quickly clogged with the mesh fibers 2. The fibers tend to bind together into clumps and strands that wrap around agitators, such as shafts, augers, and paddles, that are rotated within the fibers in a hopper. Additionally, a large percentage of the mesh fibers 2 that are eventually forced through the feed hopper are typically damaged as the thin main and/or side fibrils 4, 6, 8 are broken. Another shortcoming with the Mleczewski and Horton systems for use in delivering mesh fibers 2 is the teaching of a blower to forcefully blow or push material out of the discharge of the system or hopper. This delivery method is not useful for delivery of mesh fibers 2 because of the friable or separable nature of each mesh fiber 2. A mesh fiber 2 generally would expand as shown in FIG. 1A when exposed to blowing forces and, depending on the length of the delivery pipe or tube, the fibrils 4, 6, 8 would become torn or otherwise damaged.

Due the limitations with existing mechanical delivery systems, these industries have had to rely on manual methods of adding the mesh fibers to concrete mixing tanks or other mixing devices. More specifically, delivery of a "measured" amount of the mesh fibers to a concrete mixing tank is accomplished by having several workers manually throw a predetermined number of bags of the mesh fibers into an opening in the tank at a concrete plant or into the mixing tank of a ready mix truck. The bags are fabricated of unique material that degrades during mixing but remnants of the bag often remain in the concrete, especially if the bags are added too late in the mixing process. This method of adding the material is labor intensive which increases costs and worker safety concerns and is unreliable for achieving the type of mixing needed to obtain the fill benefits of adding the mesh fiber material to the concrete.

Another concern for the addition of the mesh fibers to concrete is that the delivery or addition of the fibers must be done in a relatively short time because the fibers are added only when the concrete mix is charging, i.e., when additives are being loaded. This provides only a short window of opportunity for delivering the fibers to the concrete mixing or processing bin.

Consequently, there remains a need in the concrete and structural prefabrication industries for a reliable, safe, cost-effective, and time-efficient (i.e., within charging window) method and apparatus for delivering a known quantity of mesh fibers to a concrete mixing tank or other mixing device. Further, it is desirable that such delivery method and apparatus be able to convey the mesh fibers with little or no damage to the mesh fibers such that the bonding and reinforcing characteristics of the mesh fibers are retained.

SUMMARY OF THE INVENTION

To address the above discussed needs for delivering known amounts of lightweight, friable mesh fibers, the present invention is directed to a material feed system for selectively delivering metered or measured quantities and weights of mesh fibers to a concrete or other material mixing tank. As discussed in the background, the material feed system includes a hopper that is particularly suited for receiving and delivering the mesh fibers without damaging the mesh fibers and/or clogging. In this regard, the hopper is generally frustoconical in shape with a smooth inner surface to minimize snagging the fibers and to control frictional forces between the mesh fibers and the inner surface. As will become clear from the discussion of the various aspects of the invention, the unique hopper of the invention works in combination with the other inventive aspects of the invention to address the needs of the construction industry and to resolve problems of conveying mesh fibers that exist in prior art devices.

According to one aspect of the invention, the hopper is structurally supported and physically configured for rotating at a rotation speed selected to be slow enough such that the fibers move only slightly outward toward the smooth inner surface of the hopper and in a circular path with the hopper before they are quickly guided downward through the hopper. In other words, the mesh fibers are subjected to much more downward movement than horizontal, spinning movement to minimize the risk of binding and clumping (i.e., forming of bridged surfaces in the hopper). A structural support assembly is included in the material feed system to support the hopper and also allow it to rotate smoothly around its central axis. Although this type of support can be achieved in a number of ways, in one embodiment, the structural support assembly includes three hopper supports with roller bearing surfaces that contact a support rail rigidly attached to the outer surface of the hopper.

To rotate the hopper, a drive assembly is provided that contacts the outer surface of the hopper to provide the motive force to achieve the selectable rotation speed. In one embodiment, the drive assembly includes a motor that rotates a cog wheel that connects with a drive chain mounted to the outer surface of the hopper. In another embodiment, the drive assembly includes a motor that rotates a drive wheel with a rubber tire that contacts a support and drive track on the exterior of the hopper. Of course, those skilled in the art will understand that any number of other methods can be used to rotate the hopper, such as, for example, a system comprising a belt and pulley system and other well-known drive systems and components. The rotation speed can be selected for the specific type of mesh fibers, size and shape of the hopper, and desired feed rate.

According to a related aspect of the invention, the hopper includes a fiber guide to further encourage the mesh fibers to flow downward through the hopper as it is pushed outward by centrifugal forces against the inner surface of the hopper. The fiber guide is mounted on the inner surface of the hopper and provides a path for the fiber to follow as the hopper is rotated. A number of path patterns or shapes can be used, and the inventor has found a continuous spiral fiber path to be especially useful. In one embodiment, the fiber guide is preferably mounted with one end adjacent to the outlet of the hopper to guide the fiber out of the hopper. In another embodiment, this lower end of the fiber guide extends a short distance (such as 1 to 5 inches) beyond the outlet of the hopper to facilitate clearing of the lower surface of the fiber guide to better control clogging of the fiber in the hopper. The upper end (e.g., the beginning of the spiral fiber path) may be positioned at a variety of points within the hopper, but in one preferred embodiment the upper end of the fiber guide is mounted relatively close to the outlet such that the spiral fiber path is only present in about the lower $1/3$ to $1/5$ of the hopper (as measured along a central axis of the hopper) and in about 180° of the inner surface of the hopper (although a fiber guide that is positioned in the entire 360° of the inner surface could be used).

To clear this fiber path, the invention includes a blade assembly configured to clear both the upper and lower surface of the fiber guide and to also break up clumps and bridges of fibers in the upper portions of the hopper. In one embodiment, the blade assembly comprises a lower blade and an upper blade mounted on a stationary support rod positioned along the central axis of the hopper. Both blades are fabricated from flexible material to better follow the contours of the fiber guide and the inner surface of the hopper, with the thickness being selected based on the flexibility of the material to provide a relatively stiff blade that flexes as it contacts the hopper and the fiber guide and also that springs back to its original shape and position when contact is ended. The shape of the upper and lower blade may vary significantly from generally square and rectangular shapes to oval and more irregular shapes and will generally be selected based on the shape of the fiber guide and the dimensions of the hopper. The lower blade sweeps fibers from the lower surface of the spiral (and may be mounted substantially perpendicular to the support rod) and the upper blade sweeps fibers from the areas above the fiber guide. An upper blade guide may also be included and mounted to the inner surface of the hopper to force the upper blade above the upper end of the fiber guide once in each rotation to avoid binding with the spiral fiber guide. In another preferred embodiment, the blade assembly includes a pair of rigid, agitation arms mounted on and extending outward from the support rod at a point above the upper blade guide. These two agitation arms extend outward to a point near the hopper inner surface and function to break up clumps and/or bridges (i.e., surfaces extending from one to the other side of the hopper) of mesh fiber that without these arms would tend to form above the contacting spiral guide and upper blade. In the above manner, the spiral-shaped fiber guide is useful, in combination with the blade assembly, to guide the fibers through the hopper so as to prevent clogging that occurs with the use of well-known interior auger-type devices that would tend to crush the mesh fibers and also become clogged.

According to another aspect of the invention, the material feed system utilizes vacuum forces to convey mesh fibers dispensed from the outlet of the hopper by pulling or drawing the mesh fibers through smooth and large diameter conduit. The vacuum forces act on the mesh fibers to retain the fibers in a compressed or compact state (i.e., not expanded or accordianed out) which better protects the thin fibrils of the fibers from tearing or otherwise being damaged. To achieve this function, a number of vacuum-type systems can be employed. In one embodiment, a vacuum conveyor assembly is operated to convey the fibers under vacuum. The vacuum conveyor assembly includes a vacuum conveyor conduit with a fiber inlet positioned adjacent the outlet of the hopper and an air inlet upstream of the fiber inlet. To develop the vacuum, a venturi aspirator and a blower are connected to the discharge end of the vacuum conveyor conduit and are operated in combination to obtain a vacuum within the conveyor conduit. The size of the venturi aspirator and blower can be varied to obtain differing flow rates of the fiber mesh; for example, a 7.5 horsepower blower can pull about 5 pounds of fiber per minute through the conveyor conduit and a 20-horsepower blower can pull about 15 pounds of fiber per minute through the conveyor conduit which is preferably less than about 100 feet in length. A fiber discharge conduit is connected to the outlet of the venturi aspirator and to the inlet of the mixing tank, and because in this conduit the fiber is being blown (i.e., not under vacuum pressure), the length of this conduit is maintained relatively short to minimize damaging the fiber which will begin to expand under the blowing forces. The vacuum conveyor assembly is effective for rapidly moving a large amount of lightweight fiber mesh with minimal damage to the friable fibers.

In another embodiment of the invention, the vacuum developed at the outlet of the hopper is enhanced and clogging is controlled by the use of a porous fiber inlet in the vacuum conveyor assembly. This porous inlet can be achieved by placing a number of openings or holes in the fiber inlet that allow a desired volume of air to be drawn directly into the fiber inlet and the vacuum conveyor conduit rather than attempting to pull air through the mesh fibers in the hopper. In practice, the use of an air permeable inlet reduces the amount of pulling or downward force applied by the vacuum conveyor assembly on the hopper during operation (i.e., due to pulling air through the fibers) by as much as 60 percent. To further encourage fiber flow in the inlet, the fiber inlet is generally funnel shaped and positioned such that the outlet of the hopper extends a short distance into the fiber inlet. In this fashion, air is drawn into the fiber inlet at a point above the entry location of the mesh fiber. Mesh fiber flow is further controlled in this embodiment by including an air injector in the air inlet through which pressurized air is injected into the vacuum conveyor conduit. This pressurized air functions to agitate and separate mesh fibers that may be clumping at the fiber inlet of the vacuum conveyer assembly, which controls clogging and better distributes the flow of mesh fibers to facilitate delivery of fibers in a quick but relatively steady feed rate, thereby improving mixing of mesh fibers in the concrete mixing tank. As a safety feature and to reduce clumping of fibers that could reduce the effectiveness of the fibers as an additive, a static electricity guard (e.g., a ground wire) can be included and placed in contact with the vacuum conveyer conduit to remove static charges that develop in the flowing mesh fibers (particularly, with polypropylene fibers).

According to still another aspect of the invention, the material feed system is operable to provide a selectable amount of mesh fibers to a mixing tank. To convey known quantities of the fiber mesh, a metered feed assembly is provided that is positioned above and adjacent the inlet to the hopper. The metered feed assembly includes a feed drum with an inlet-outlet opening and a device for rotating the feed drum to position the inlet-outlet opening. An intake or feed bin is positioned above the feed drum with an inlet in communication with bulk fiber containers (which can be supported on a hanger device above the structural support assembly) and an outlet to the feed drum configured to allow fiber to flow from the feed bin to the feed drum with limited or no leakage of the fibers past the feed drum as the feed drum rotates. During operation, the feed bin is filled with fibers from bulk containers and is large enough to hold at least the capacity of the fiber drum and preferably to hold more than the fiber drum to ensure adequate filling of the fiber drum. The fiber drum is then rotated to position the inlet-outlet opening upward into the outlet of the feed bin so as to allow fibers to flow into the fiber drum. The fiber drum is then further rotated to position the inlet-outlet opening downward to allow the fibers to flow out of the fiber drum and into the inlet of the hopper. As can be appreciated, it is preferable to rotate the feed drum at a relatively slow rate to allow the lightweight fibers to gravity fill the feed drum and to gravity dispense into the hopper. The feed drum can be a variety of shapes and sizes according to the invention. In one embodiment, the feed drum is a cylinder sized to receive and dispense batches of fiber mesh of about 25 pounds per rotation of the feed drum.

To further meter flow of fibers through the hopper, the material feed system includes devices to measure the weight of the hopper when empty, when filled, and as it is being emptied. A number of measuring devices can be used to obtain these weight measurements. For example, the structural support assembly may include load cells in each vertical leg or frame member at a point below the support points for the hopper. These load cells can be selected to transmit signals corresponding to the sensed weight of the structural support assembly and can be connected to a controller or control panel that can be used to process the signals and determine weight of the fibers passing through the hopper. The control panel can also be in communication with other components to control their operations in response to the determined weights of fibers being conveyed. In one embodiment, the control panel selectively rotates the feed drum and the hopper and operates the vacuum conveyor assembly depending on the amount of weight of fibers desired at a mixing tank.

Other features and advantages of the invention will become clear from the following detailed description and drawings of particular embodiments of the material feed system of the present invention.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings.

DETAILED DESCRIPTION OF THE INVENTION

With the above summary in mind, it may now be helpful in fully understanding the inventive features of the present invention to provide a thorough and detailed discussion of a number of specific embodiments of the invention. Specifically, the following discussion emphasizes the features of a material feed system according to the invention that provides a method and system for rapidly (i.e., about 5 pounds to about 15 pounds per minute or higher) delivering lightweight, friable mesh fibers 2 such as those shown in FIGS. 1A and 1B with high accuracy (i.e., 1 to 3 ounces per batch), but it will be appreciated that the material feed system could readily be used to deliver other lightweight materials. The invention is particularly apt for delivering the mesh fibers in an undamaged, untorn state which is difficult with prior art devices that rely on combinations of gravity feed and mechanical, internal augers and the like to push or even grind material from an inlet to an outlet of a feed bin. To describe how the invention achieves its desirable delivery functions, the discussion of the invention will progress from a full description of the components of a material feed system to the specific features of each component. The discussion will then close with a discussion of a method of delivering a known amount or weight of friable mesh fibers 2 according to the present invention.

Figure 2:
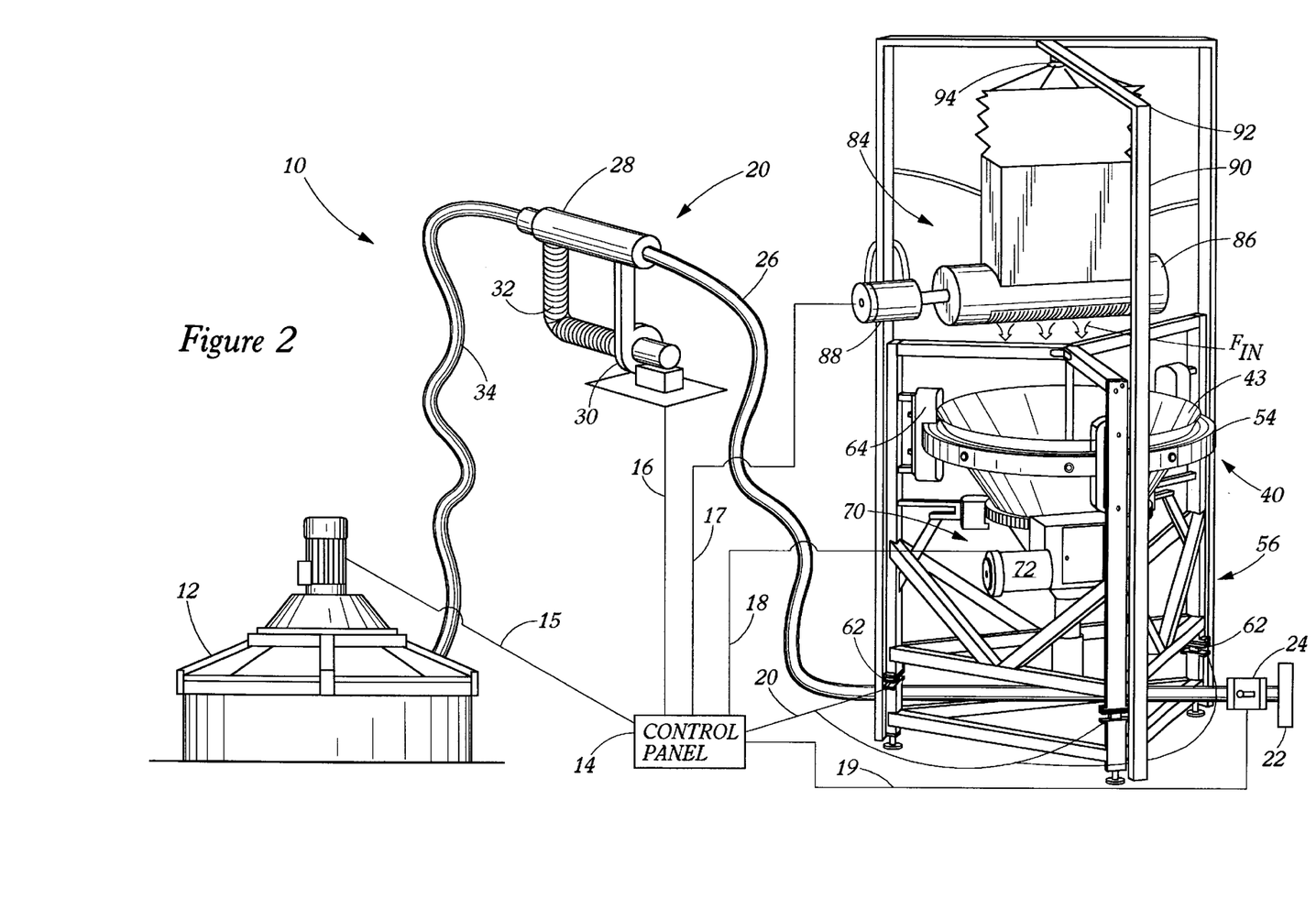
FIG. 2 is a functional, diagrammatic view of a material feed system in accordance with the present invention.

FIG. 2 depicts a material feed system 10 according to the invention that is useful for quickly delivering a desired amount of mesh fibers 2 in an undamaged state to a concrete mixing tank 12. The material feed system 10 generally includes a control panel 14, a vacuum conveyor assembly 20, and a hopper 40 and a metered feed assembly 84 mounted on a support assembly 56. The metered feed assembly 84 functions to feed discrete batches of mesh fibers 2 of known weight, e.g., 25 pounds, to the hopper 40 through the use of interchangeable bulk containers of fibers 92 that are hung with a hanger 94 over a stationary feed bin 90 with open ends for receiving and dispensing fibers 2. A feed drum 86 is slowly rotated with a motor 88 to alternately fill the drum with fibers 2 from the feed bin 90 and empty the feed drum 86 into the hopper 40. Significantly, the hopper 40 also rotates during feeding operations at a rotation rate that is just high enough to apply small forces to incoming fibers 2 that push the fibers 2 outward toward the inner surface 43 and then the fibers 2 are rapidly guided downward through the hopper 40 (with downward forces (i.e., physical and vacuum forces) and agitation being provided with other components discussed in detail below). A drive assembly 70 is provided to provide the desired rotation and rotation rate.

At the outlet of the hopper 40, a vacuum conveyor conduit 26 of the vacuum conveyor assembly 20 is provided in which a vacuum is established to draw or pull the fibers 2 through the conduit 26 in a stick form or compressed state (see FIG. 1A) that reduces the risk of damage during transport. At the outlet of the vacuum conveyor assembly 20, the vacuum changes to a blowing force that pushes the fibers 2 through the fiber discharge conduit 34 into the concrete mixing tank 12. Because the fibers 2 can be damaged by blowing forces, the length of the discharge conduit 34 is preferably maintained relatively small, preferably less than about 30 feet and more preferably less than about 10 feet. Additionally, the control panel 14 can be connected to each of the motors or motor controllers of the components via lines 15, 16, 17, 18, and 19 and to load cells 62, which can be used to monitor the weight of fibers 2 flowing through the hopper 40, via line 20 to remotely and automatically coordinate the operations of the material feed system 10 (as will be discussed in more detail below). As will become clear from the following discussion, these components can be effectively operated in combination to overcome problems experienced in the construction industries and to deliver the mesh fibers 2 rapidly and in a metered fashion that minimizes damage to the fibers 2.

Figure 3:
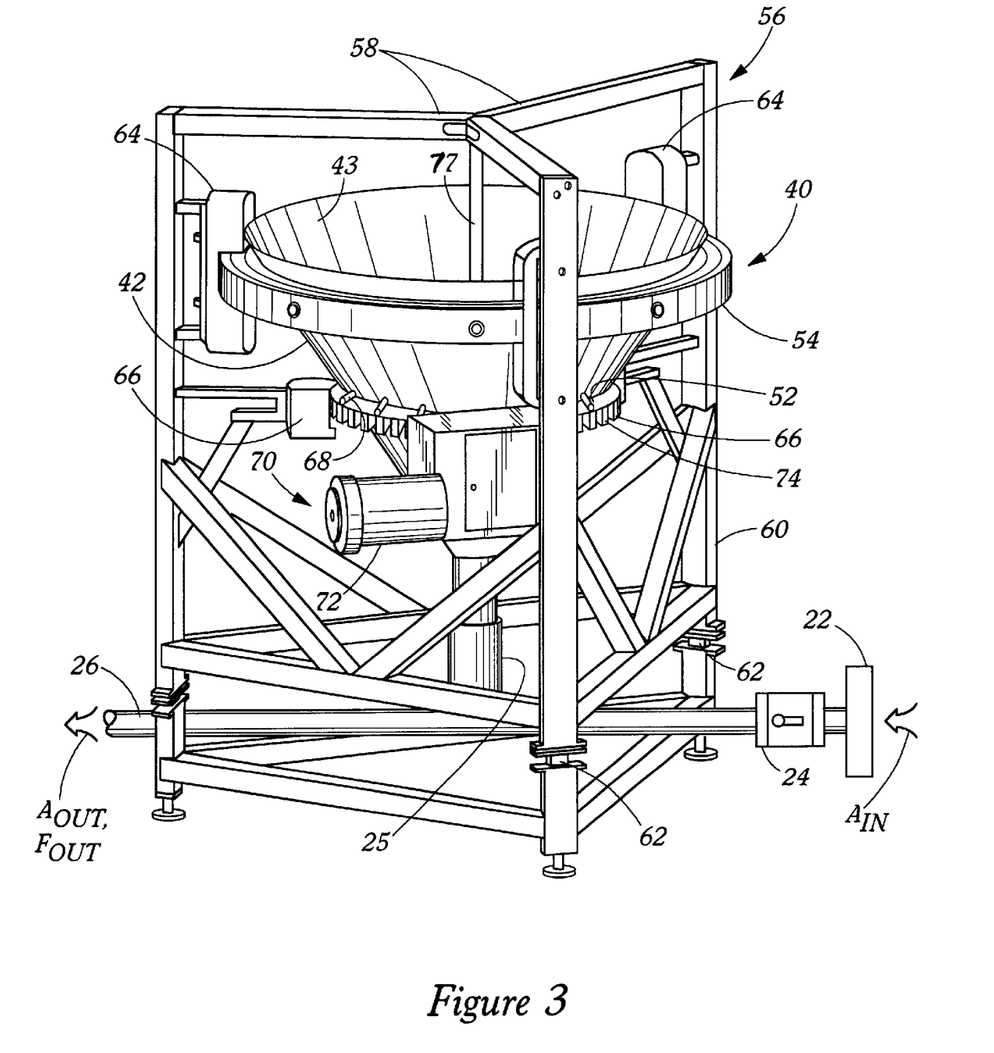
FIG. 3 is an enlarged perspective view of the hopper, hopper drive assembly, and the hopper support assembly of the embodiment of the invention shown FIG. 2.
Figure 4:
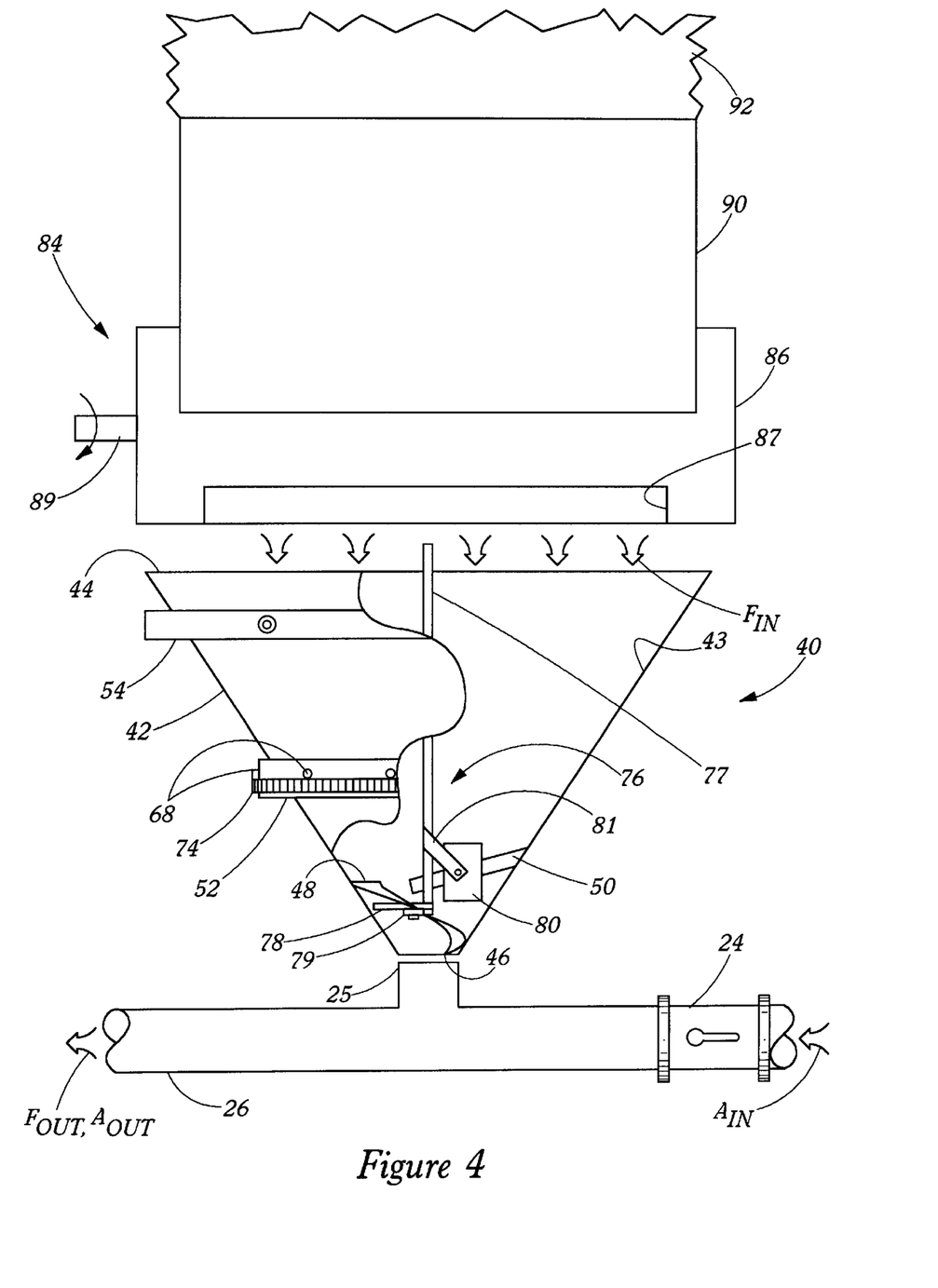
FIG. 4 is a partial, enlarged elevation view of the metered feed system, hopper, and vacuum conveyor conduit of FIG. 2 with a cut away view of the hopper to illustrate the interior of the hopper showing the spiral fiber guide and to illustrate the blade assembly used to clean the fiber guide and guide fibers.

Referring to FIGS. 3 and 4, one embodiment of a hopper, drive assembly or system, and inlet components and configurations for a vacuum conveyor assembly is shown. As illustrated, the hopper 40 is generally fabricated to be easily rotated and when rotated to impart a slight centrifugal force on contained materials that are then guided downward through the hopper 40. In this regard, it is important to remember that it is desirable to apply much larger vertical or downward forces on the fibers 2 than horizontal forces such that the fibers 2 have less tendency to bind together and move quickly down through the hopper 40. Although other shapes may be useful in practicing the invention, the illustrated hopper 40 includes a hopper wall 42 that slopes from a relatively large inlet 44 to a much smaller outlet 46 to form a frustoconical or funnel shape that lends itself to guiding fibers 2 through the hopper 40 when the hopper 40 is rotated at an acceptably high rotation rate. For example, in one embodiment, the hopper is approximately 3 feet in height as measured along a central axis, the inlet 44 is in the range of 3 to 4 feet in diameter and the outlet 46 is less than about 1 foot in diameter. To minimize snagging and friction between the fibers 2 and the hopper wall 42 during operations, the hopper wall 42 preferably has a smooth inner surface 43. A large range of surface finishes may be acceptable depending on the materials being conveyed and the material, such as steel, used to fabricate the hopper wall 42, but in general the inner surface 43 has a relatively smooth surface finish.

To allow the hopper 40 to rotate about its central axis, the hopper 40 is preferably supported in a manner that allows for relatively low friction rotation while still providing structural stability. As illustrated, the hopper 40 includes a hopper support rail 54 rigidly mounted near the inlet 44 of the hopper 40 that creates a smooth rail or track upon which supportive forces, both vertical and horizontal forces, can be applied by the support assembly 56. In this regard, the support assembly 56 includes side frame members 60 upon which three hopper supports 64 are provided to interact with the hopper support rail 54 to provide vertical and horizontal structural support. To allow the hopper 40 to rotate, the hopper supports 64 may include any number of bearing devices and surfaces such as, but not limited to, a pair of roller bearing wheels or bearing surfaces (not shown) that contact the hopper support rail 54 on its upper and lower surfaces.

According to an important aspect of the invention and referring to FIG. 4, the hopper 40 includes fiber guide 48 to direct the fiber 2 that is pushed outward by the rotation of the hopper wall 42 and downward by the funnel shape of the hopper wall 42 quickly along the inner surface 43 to the outlet 46. As can be appreciated, the fibers 2 may have a tendency to relatively slowly migrate downward in a rotating funnel such as the hopper wall 42 without further guidance. In this regard, the fiber guide 48 creates a spiral shaped track which encourages or forces the fibers 2 to move along the smooth inner surface 43 to the outlet 46. In this regard, a number of such tracks could be formed, e.g., by using multiple fiber guides 48, and these multiple tracks could be made narrow or relatively wide simply by selecting a loose or tight spiral shape. Additionally, the fiber guide(s) 48 could extend from near the inlet 44 (e.g., a point where force initially push the fibers 2 against the inner surface 43) to the outlet 46. As illustrated, the inventor has found a single fiber guide 48 that is mounted continuously to the inner surface 43 in the bottom of the hopper (e.g., in the 1/3 to 1/5 of the lower portion of the hopper 40) is effective at guiding the fibers 2 to the outlet 46. This smaller sized fiber guide 48 minimizes manufacturing costs while reducing binding or clogging of the fibers 2 and effectively and rapidly guiding the fibers 2 through the hopper 40.

According to another important aspect of the invention, the material feed system 10 is configured to apply physical forces on the fibers 2 in the hopper 40 to break up clumps or bridges and to guide the fibers 2 downward to further control clogging of the hopper 40 without damaging the fibers 2. In this regard, the material feed system 10 includes a blade assembly 76 illustrated in FIG. 4. The blade assembly 76 generally includes a stationary support rod 77 that is mounted rigidly to upper frame members 58 of the support assembly 56 and extends downward into the hopper 40 through the inlet 44. Once during each rotation of the hopper 40, the blade assembly 76 functions to sweep or clear the spiral fiber guide 48 of any build up of fibers 2 that may occur because of the lightweight nature of the fibers 2 and static electricity or other forces, such as friction, that may cause the fibers 2 to clump together and clog the hopper 40. To clear the fiber guide 48, the blade assembly 76 includes one or more blades fabricated of flexible material, such as well-known plastic materials with a thickness of about 1/4 to 3/4 inch, that can comply with the unique shape of the inner surface 43 of the hopper wall 42 and the upper and lower surfaces of the fiber guide 48.

As illustrated, the blade assembly 76 includes a lower blade 78 mounted on the bottom of the rod 77 with blade mount 79 for clearing the lower surfaces of the fiber guide 48 and an upper blade 80 mounted above the fiber guide 48 on rod 77 with blade mount 81 for clearing the upper surfaces of the fiber guide 48. The lower blade 78 is generally planar in shape and is preferably mounted substantially perpendicular to the axis of the rod 77 so as to more readily be able to contact and follow the lower surface of the spiral fiber guide 48 (and to a lesser degree the inner surface 43) during rotation of the hopper 40 and to then flex back upward to the top of the spiral track to begin the next rotation. The lower blade 78 tends to push any fibers 2 out of the hopper 40 which fail to exit the outlet 46 merely by the small forces developed and applied during rotation. The upper blade 80 may be any number of shapes, and as illustrated is a planar rectangle, that contact the upper surfaces of the fiber guide 48 and the inner surface 43 to free up any fiber that may tend to block or clog the spiral track and outlet 46 of the hopper 40. To return the flexible upper blade 80 to the top of the spiral fiber guide 48, an upper blade guide 50 can be mounted to the inner surface 43 of the hopper 40 to contact the upper blade 80 during each rotation of the hopper 40 and flex it upward to the top of the fiber guide 48. This flexing of the upper blade 80 also stores energy in the upper blade 80 which it releases as it flexes to its rest position (i.e., generally parallel to an axis of the rod 77) to more forcefully sweep the fibers 2 downward into the hopper 40 and away from the fiber guide 48.

To provide one of the forces (i.e., an agitation force with a small component of centrifugal force) that urges the fibers 2 to flow through the hopper 40, the material feed system 10 includes the drive assembly 70 that contacts the outer surface of the hopper wall 42 and rotates the hopper wall 42. A range of rotation rates can be employed to apply small centrifugal forces to the fibers 2 that first urge the fibers 2 outward against the inner surface 43 but what is more important, the spinning of the hopper 40 agitates the fibers 2 which then contact the stationary components of the blade assembly 76 and the spiral fiber guide 48. The inventor had determined that agitation or movement of the fibers 2 is necessary to effectively feed the fibers 2 through the hopper 40, but that it is generally undesirable to apply these agitation forces internally to the hopper 40 (such as by the use of a spinning auger). Once the fibers 2 begin spinning in the hopper 40 it is important to urge them downward to minimize clumping within the hopper 40 that may result in bridging (i.e., levels of the fibers 2 being developed that block flow of the fibers 2 downward), and in this regard, the blade assembly 76 in combination with the spiral fiber guide 48 provides this urging function (as discussed above). It may be desirable that the drive assembly 70 be able to selectively rotate between a minimum rotation rate and a maximum rotation rate to provide a range of feed or flow rates of the fiber 2 through the hopper 40. For example, but not as a limitation, the rotation rate may be selected from a range of about 15 revolutions per minute (RPM) to about 35 RPM or higher to achieve a range of desired feed rates. The drive assembly 70 could likewise employ a variety of well-known drive methods to rotate the hopper 40 at these rotation rates. Although not shown, the drive assembly 70 could use a system of belts that contact the hopper wall 42.

As illustrated in FIGS. 3 and 4, the drive assembly 70 includes a drive chain 74 rigidly mounted onto and supported a chain mounting rail 52 included on the outer surface of the hopper wall 42. A motor 72 is included to turn a cog wheel (not shown) with teeth that mate with the drive chain 74 to cause the hopper wall 42 to rotate at a desired rotation rate. To maintain the location of the drive chain 74 on the chain mounting rail 52, roller guides 68 are mounted on the chain mounting rail 52 in a spaced apart manner above the position of the drive chain 74. Additionally, two chain guides 66 with freewheeling cog wheels (not shown) are included in the support assembly 56 to keep the drive chain 74 properly positioned on the chain mounting rail 52.

To convey the mesh fibers 2 after discharge from the hopper 40, the material feed system 10 includes the vacuum conveyor assembly 20. As discussed earlier, the mesh fibers 2 will readily tear or otherwise become damaged if conveyed significant distances by blowing forces that tend to cause the fibers 2 to expand (see FIG. 1B) exposing the thin fibrils 6, 8. In contrast, the invention establishes a vacuum at the outlet of the hopper 40 to convey the fibers 2 in a compact state (see FIG. 1A) that minimizes damage to the lightweight, friable fibers 2. A variety of systems and devices can be used to establish the necessary vacuum at the outlet 46 of the hopper 40, such as vacuum pumps and the like.

In the embodiment illustrated, the vacuum conveyor assembly 20 makes beneficial use of a venturi aspirator 28 to achieve the vacuum within the vacuum conveyor conduit 26. The vacuum conveyor conduit 26 has a fiber inlet 25 positioned beneath and adjacent the hopper outlet 46 and an air inlet 22 with an air inlet control valve 24 (e.g., a butterfly or other type of standard fluid valve). During operation, the air inlet control valve 24 is opened to allow air, $A_{IN}$, to enter and a vacuum to be developed within the conveyor conduit 26 and air, $A_{OUT}$, and fibers, $F_{OUT}$, to flow in the conveyor conduit 26 and closed to stop flow of fibers 2. The outlet end of the conveyor conduit 26 is connected to the venturi aspirator 28 (e.g., a VA 6 ½CA-20-S-6 venturi aspirator produced by Quickdraft and similar venturi aspirators) which has a blower 30 (e.g., 7 ½ to 20 or higher horsepower blower unit) that takes inlet air near the discharge of the venturi aspirator 28 through air return conduit 32. As will be understood by those skilled in the art, the venturi aspirator 28 and blower 30 work in combination to create a venture effect within the venturi aspirator 28 that in turn develops an effective vacuum in the conveyor conduit 26 which may be a relatively long, such as 100 feet of more in length.

The length of the conveyor conduit 26 allows the venturi aspirator 28 and blower 30 to be located remote from the hopper 40 and near the concrete mixing tank 12 such that the fiber discharge conduit 34 can be maintained relatively short. This is important because at the discharge of the venturi aspirator 20 the fibers 2 are blown into and through the fiber discharge conduit 34, and as discussed earlier, the period during which blowing forces are applied is preferably minimized to limit expansion of the fibers 2 and possible damage to the fibers 2. Of course, additional features that will be readily apparent to those skilled in the art but not illustrated may be desirable for the vacuum conveyor assembly 20, such as a static discharge device to eliminate static electricity which may develop in the conveyed fibers 2 and cause safety problems and some clumping of the fibers 2. Such accessory devices are considered within the scope of this invention and may include a static guard or an electrical discharge or drain wire to ground attached to the vacuum conveyor conduit 26 or other components of the vacuum conveyor assembly 20.

As may be appreciated, it is desirable to provide a known quantity of the fibers 2 to the concrete mixing tank 12 to achieve a desired ratio of materials, such as a predetermined quantity or volume of fibers 2 for each cubic yard of concrete. To provide a fiber quantity control method, the material feed system 10 includes the support assembly 56 which is equipped with a load cell 62 in each of its side or vertical frame members 60. The load cells 62 may be selected from a wide range of commonly available load cells or similar devices that transmit an electric signal in response to downward pressure applied to the cell, e.g., weight of objects positioned above the cells. The electric signals are transmitted for processing to the control panel 14 over the line 20. The load cells 62 are preferably located below the mounting point of the hopper 40 to improved weight sensing and are included in each side frame member 60 to provide a more accurate signal corresponding to the weight. The control panel 14 can be calibrated by setting or inputting the weight of the supported components above the load cells 62 when the hopper 40 is empty and then computing the weight of the components when the hopper 40 is initially filled. The signals from the load cells 62 can then be monitored and processed by the control panel 14 to determine the amount of fibers that have been discharged from the hopper 40 during feeding operations. The inventor has achieved accuracies of 1 to 3 ounces per batch of fibers 2 with these components.

It is also desirable to provide automated feed of the fibers 2 into the hopper 40 that typically is used in combination with the load cells 62. The metered feed assembly 84 functions to allow an operator of the material feed system 10 to deliver fibers 2 in discrete batches. For example, it may be desirable based on the size of the concrete mixing tank 12 to provide 25 pound batches of the fibers 2 to the concrete mixing tank 12 or to provide this or another size batch periodically (i.e., it may be beneficial to provide a batch of fibers 2 and then allow a mixing period to pass prior to delivering the next batch of fibers 2 for mixing).

In this regard, the metered feed assembly 84 shown best in FIG. 4 includes a cylindrical feed drum 86 with an opening 87 that acts as both an inlet and an outlet to the feed drum 86 depending on the orientation of the feed drum 86. The feed drum 86 is rotated at a desired rate by motor 88 which turns drive shaft 89 that is connected to the feed drum 86. During each rotation, the feed drum 86 is positioned with the opening 87 facing upward into the rectangular feed bin 90, which is open ended and contains fibers 2 supplied by bulk fiber container 92 supported on hanger 94. In this position, the feed drum 86 is filled with a batch (such as 25 pounds) of fibers 2 that are gravity fed from the feed bin 90 through the opening 87. The feed bin 90 is preferably positioned tightly against the feed drum 86 surfaces to control leakage but not so tightly that the feed drum 86 is prevented from rotating. Once filled with a batch of fibers 2, the feed drum 86 continues to rotate such that the opening 87 is not blocked by the feed bin 90, and the contained fibers 2 begin to empty into the inlet 44 of the hopper 40. Rotation continues and the feed drum is emptied or nearly emptied of fibers 2 and a batch of fibers 2 are provided to the hopper 40. The rotation of the feed drum 86 is preferably relatively slow to allow proper filling and emptying of the feed drum 86, and if desired, to properly space the delivery of fibers 2 to the concrete mixing tank 12 (e.g., the metered feed system 84 can function to regulate the tiling or feed rate of fibers 2 hopper 40, conveyor system 20, and concrete mixing tank 12). The rate of rotating the feed drum 86 is also preferably set such that delivery of fibers 2, $F_{IN}$, into the hopper 40 does not exceed the discharge rate of fibers 2 from the hopper 40. For example, if the hopper 40 is discharging fibers 2 at a rate of 5 pounds per minute and the feed drum 86 is sized to deliver batches of 25 pounds, the rotation rate would preferably be about one rotation every 5 minutes.

Referring to FIG. 2, the material feed system 10 is illustrated to include a control panel 14 in communication via lines 15, 16, 17, 18, 19, and 20 with the components of the material feed system 10 discussed above in detail. The control panel 14 may have numerous configurations and components, such as microprocessors, memory devices, and display devices, that allow it to receive signals over these communication lines, to process communication signals and load sensing signals, and to transmit control signals over these communication lines to control operations of the material feed system 10. Each of the components, in turn, may include motor controllers and the like that facilitate remote operation and control. The operation and functional demands of the control panel will become clear from the following discussion of one mode of operation of the material feed system 10.

According to the invention, a unique method for conveying lightweight, friable mesh fibers 2 is provided and will now be explained in detail. Initially, the vacuum conveyor assembly 20 is shutdown, the hopper 40 is empty and not rotating, and the feed drum 86 is empty with its opening 87 directed downward. As a first step, a demand for a desired amount of fibers 2 and at a certain feed rate is communicated from the concrete mixing tank 12 to the control panel 14 via line 15 or by manual communication to an operator of the material feed system 10. At this point or earlier, a new bulk feed container 92 is connected to the hanger 94 and the top of the feed bin 90 to provide a supply of fibers 2 to the material feed system 10. Of course, new bulk feed containers 92 will be provided as necessary during the operation of the material feed system 10. Next, the control panel 14 is used to concurrently begin operation of the metered feed assembly 84, the hopper 40, and the vacuum conveyor assembly 20.

The motor 88 is started to slowly rotate the feed drum 86 to position the opening 87 up into the feed bin 90 and place a batch of the fibers 2 into the feed drum 86. The motor 72 is started to begin rotating the hopper wall 42 at a rotation rate high enough to urge fibers through the hopper 40 at the desired feed rate. The air inlet control valve 24 is opened and the blower 30 motor is started to develop a vacuum in the vacuum conveyor conduit 26 that will draw fibers 2 discharged from the hopper 40 through the conveyor conduit 26 at the desired feed rate.

Once filled with a batch of fibers 2, the feed drum 86 continues to rotate to clear the opening 87 of the feed bin 90 and begin dispensing the first batch of fibers, $F_{IN}$, into the inlet 44 of the hopper 40. The fibers 2 enter the rotating hopper wall 42 and are subjected to centrifugal forces that push the fibers 2 outward and against the smooth inner surface 43. The funnel shape of the hopper wall 42 in combination with the centrifugal and gravity forces cause the fibers 2 to travel generally in a spiral downward in the hopper 40 toward the outlet 46. The fibers 2 then begin to contact the fiber guide 48 where they follow spiral track formed by the fiber guide 48 along the inner surface 43 and out of the outlet 46 of the hopper 40. The stationary lower and upper blades 78 and 80, respectively, act in combination to flexibly contact the lower and upper surfaces, respectively, of the fiber guide 48 so as to clean and sweep fibers through the spiral track and prevent clogging within the hopper 40. The control panel 14 receives signals from the load cells 62 to monitor the feed rate of fibers 2 through the hopper 40.

The fibers 2 discharged from the outlet 46 of the hopper 40 are drawn into the fiber inlet 25 of the vacuum conveyor conduit 26 by the vacuum created by the venturi aspirator 28 and blower 30. The fibers, $F_{OUT}$, and air, $A_{OUT}$, flow from the hopper 40 through the conveyor conduit 26 toward the venturi aspirator 28. Preferably, the conveyor conduit is relatively large diameter, flexible conduit with smooth sides to reduce friction and snagging and allow ready manipulation and placement of the material feed system 10 in most work areas. The fibers, $F_{OUT}$, are conveyed under vacuum pressures and are typically compressed as shown in FIG. 1A which minimizes damage during travel in the conveyor conduit 26. At the discharge of the venturi aspirator 28, the fibers 2 are subjected to a blowing force that pushes the fibers 2 in the fiber discharge conduit 34 the relatively shorter final distance and larger diameter fiber discharge conduit 34 to the concrete mixing tank 12 for mixing into the concrete mixture.

Depending on the size of the feed drum 86 and the amount of fibers 2 requested for addition to the concrete mixing tank 12, the motor 88 is allowed to turn the feed drum 86 to obtain additional batches of fibers 2 and feed them to the hopper 40. When the control panel 14 determines the desired amount of fibers 2 have been delivered (e.g., by processing signals from the load cells 62 or receiving other terminate-operations communications), the control panel 14 concurrently and/or sequentially stops motor 88 to stop rotation of the feed drum 86, stops the motor 72 to stop rotation of the hopper 40, shuts air inlet control valve 24, and stops the motor of the blower 30.

Figure 5:
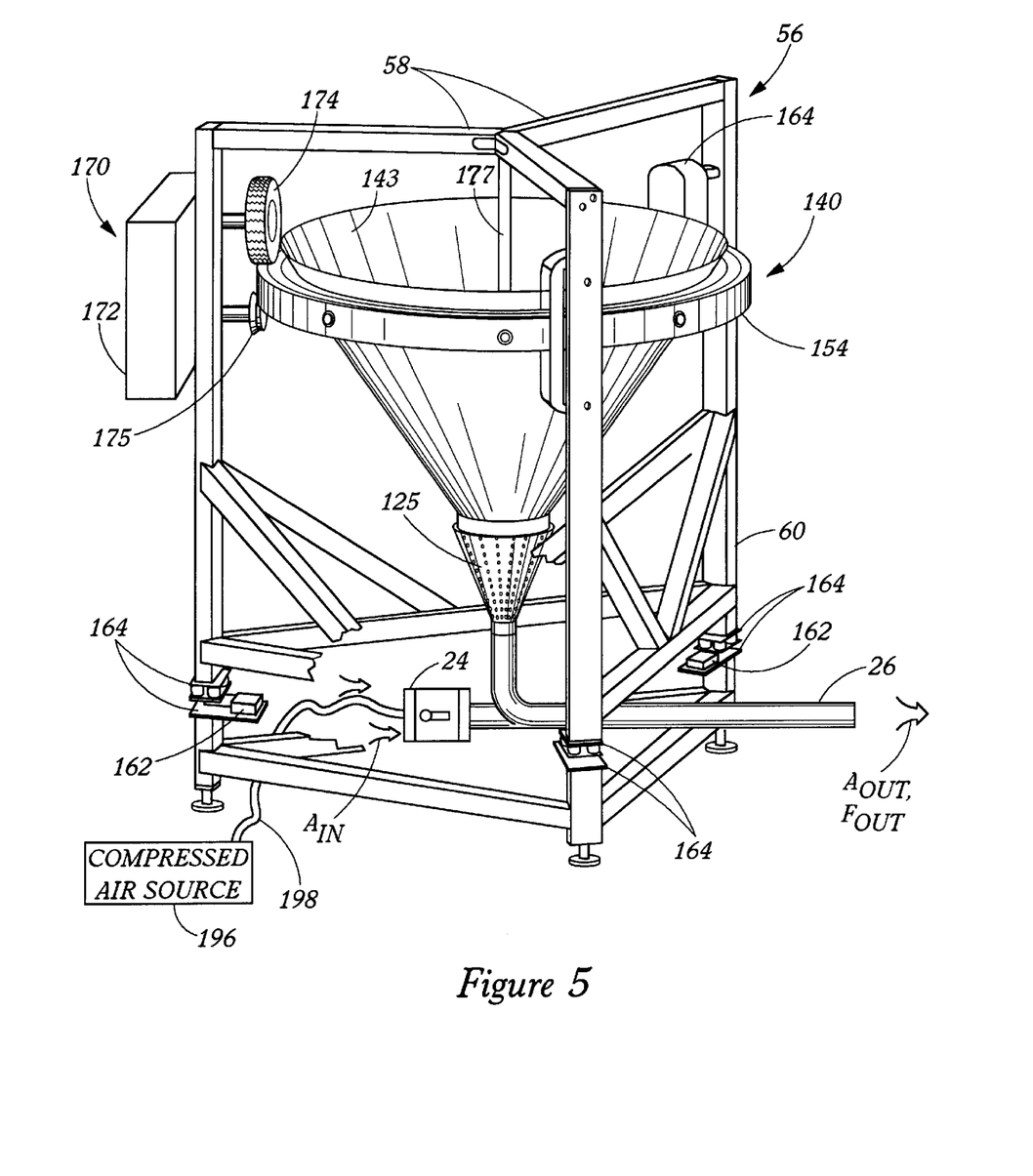
FIG. 5 is a perspective view similar to that of FIG. 3 illustrating an alternate hopper, hopper drive assembly, and portion of the vacuum conveyor assembly according to the invention.
Figure 6:
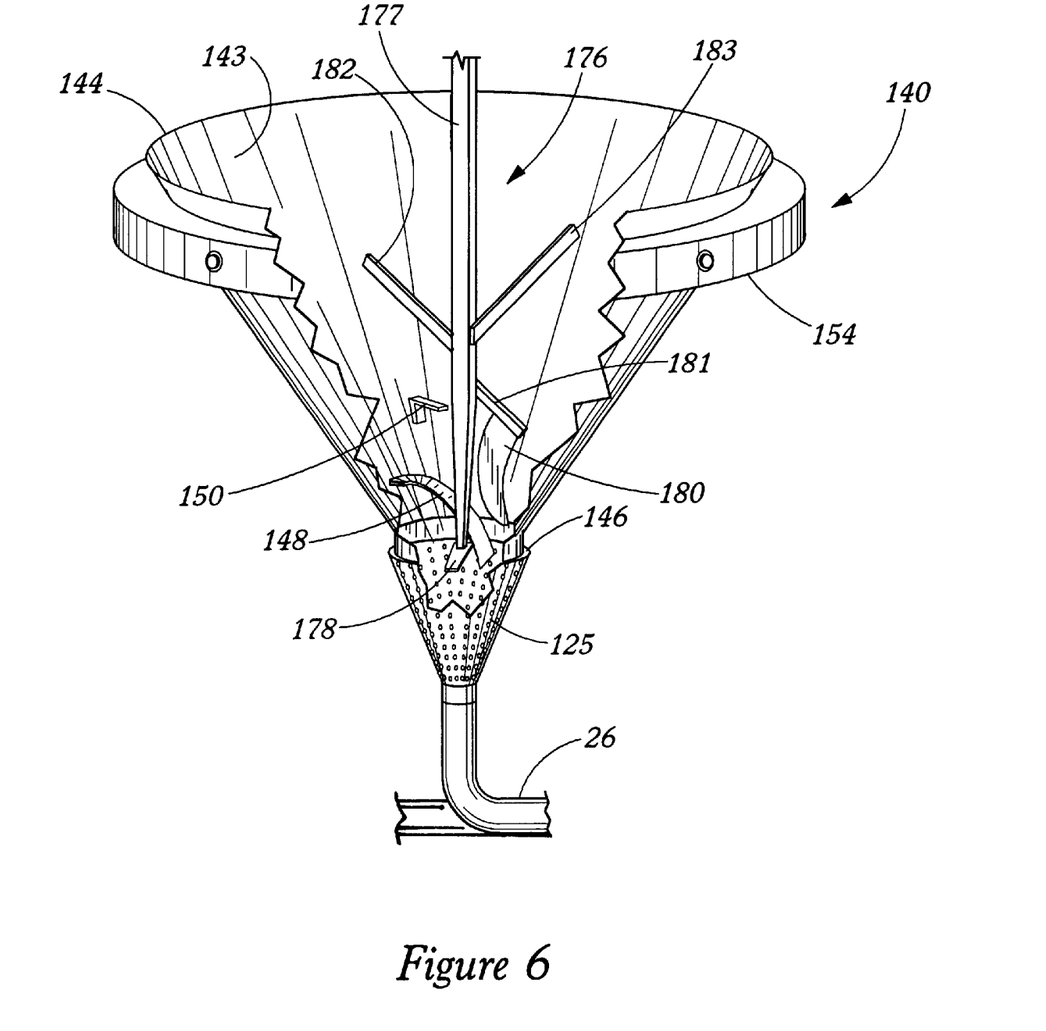
FIG. 6 is a partial, enlarged view of the hopper and vacuum conveyor assembly of FIG. 5 with a cut away view of the hopper to illustrate the interior of the hopper showing an alternate embodiment of the spiral fiber guide, blade assembly, and fiber inlet to the vacuum conveyor conduit.

Referring to FIGS. 5 and 6, the inventor has determined that increased enhanced and effective mesh fiber transport and delivery can be achieved by making several alterations to components of the material feed system 10 of FIG. 1 that enhance agitation of the fibers within the hopper and that enhance the development of a vacuum at the hopper outlet. FIG. 5 is a view similar to that of FIG. 3 with some of the support structure removed or cutaway for clarity of illustration. In this alternate embodiment, a funnel-shaped hopper 140 is shown with a smooth inner surface 143 and an inlet 144 and an outlet 146 that is supported within the support assembly 56. The hopper 140 includes a hopper support rail 154 which mates with support rollers 175 (that may be housed in hopper supports 164 or left exposed). Preferably, the support rollers 175 are mounted on an axle with the use of a spring washer or other device to push the roller 175 against the hopper support rail 154 to account for variations in the shape of the rail 154 (e.g., the rail may be slightly out-of-round) while also limiting the vibration that is transferred from the hopper 140 to the support assembly 56. The hopper 140 is rotated at a selected rotation rate (e.g., 15 to 35 or more RPM) with the use of a motor 172 that drives the drive tire 174 that has a rubber or other high traction surface that contacts the upper portion of the hopper support rail 154. The drive tire 174 may be air filled such that it complies with the surface of the hopper support rail 154 during operation. This drive assembly 170 may be useful in many applications where a chain or other drive system is unacceptable due to the amount of vibration created.

To enhance the development of a vacuum and to better control fiber flow, the fiber inlet 25 of the vacuum conveyor assembly 20 of FIGS. 3 and 4 is replaced in this embodiment of the invention with a funnel-shaped fiber inlet 125 that is perforated. The perforations are formed in the fiber inlet 125 to provide a second air inlet (in addition to air inlet 22) to facilitate forming a vacuum and to better draw the fibers 2 down through the hopper 140. As may be appreciated, drawing or pulling air through a quantity of fibrous, mesh fibers 2 can be difficult and cause air flow problems as the fibers 2 tend to bind together to function as a relatively nonporous filter medium. To overcome this air flow problem, the number and size of perforations in the fiber inlet 125 is preferably selected to allow sufficient air to be drawn into the fiber inlet 125 and then the vacuum conveyor conduit without allowing fibers 2 to be discharged or to bind to the surface of the fiber inlet 125. By drawing air into the vacuum conveyor assembly 20 at this point the flow of fibers 2 in the inlet 125 is improved because the air flow minimizes friction forces that otherwise could develop between the fibers 2 and the inner surface of a fiber inlet. Further in this regard, the fiber inlet 125 preferably has a smooth inner surface to facilitate flow of the fibers 2. In this manner, the perforated or porous fiber inlet 125 enhances the creation of a vacuum and reduces the formation of fiber clumps and clogging in the vacuum conveyor assembly 20.

To further improve fiber flow in the material feed system 10, the illustrated embodiment of the vacuum conveyor assembly 20 injects a small stream of pressurized air (or other gas) into the vacuum conveyor conduit 26 at the air inlet control valve 24. This stream of pressurized air is introduced by including a pressurized air inlet line 198 connected to the air inlet control valve 24. The pressurized air inlet line 198 is connected to the compressed air source 196 (such as, but a standard air compressor rated at 15 to 375 cfm or higher delivering about 175 psi or another desirable pressure). During typical operations, the compressed air source 196 would be operated concurrently with the blower unit 30 of the vacuum conveyor assembly 20 to inject pressurized air into the vacuum conveyor conduit 26. This injected air flows rapidly and is useful for breaking up clumps of the fibers 2 that exit the fiber inlet 125 and to create a more steady flow rate of the fibers 2 in the vacuum conveyor conduit 26, with both functions being beneficial for enhancing delivery and mixing of the fibers 2 in the concrete mixing tank 12.

Turning now to FIG. 6, fiber flow through the hopper 140 is enhanced with the use of another preferred embodiment of a blade assembly 176 and by extending the spiral fiber guide 148 beyond the outlet 146 of the hopper 140. By extending the fiber guide 148 a short distance (such as 2 to 6 inches) beyond the hopper 140, the lower blade 178 is able to more readily clear the bottom surface of the fiber guide 148. Additionally, the upper blade 180, which is shown oblong in shape, contacts the upper surface of the fiber guide 148 and actually extends beyond the outlet 146 during each rotation of the hopper 140 to push the fibers 2 into the fiber inlet 125 of the vacuum conveyor assembly 20. The blade assembly 176 is similar to the blade assembly 76 and during each rotation of the hopper 140, the upper blade 180 contacts the spiral fiber guide 148 for about 180° of the rotation at which point it contacts the upper blade guide 150 mounted on the inner surface 143 of the hopper 140. The upper blade 180 flexes and is pushed upward, storing energy until it is released from the upper blade guide 150 at which point it begins to release the stored energy by springing back to it more downward orientation. In this way, the upper blade 180 functions to sweep fibers 2 downward during each rotation of the hopper 140.

According to another unique feature of the blade assembly 176 shown in FIG. 6, the blade assembly 176 includes a lower and an upper agitator arm 182 and 183, respectively. As will be understood by those in the mesh fiber delivery arts, the fibers 2 have a strong tendency to bind together and to any angled surface. Specifically, during operation of the material feed system 10, the fibers 2 have a tendency to bind together to form clumps which then start to form bridges or complete levels of fiber material from one side to the other of the hopper 140. To prevent these clumps and bridges from obstructing flow of fibers 2 through the hopper 140, the agitator arms 182, 183 are mounted to the stationary support rod 177 and extend outward (and, preferably, slightly downward) from the rod 177 generally toward the inner surface 143 of the hopper. Preferably the arms 182, 183 are fabricated from a rigid material such as a metal so as to be able to disburse or break up the clumps of fibers. The arms 182, 183 typically are relatively narrow (such as ¼ to ½ inch) to flow easily through the fibers 2 without damaging the fibers during each rotation of the hopper 140. A number of shapes in addition to the rectangular shape shown, may be utilized and the length of the arms 182, 183 is preferably selected such that the arms 182, 183 extend to a point adjacent but not contacting the inner surface 140. The arms 182, 183 are positioned on the rod 177 so as to break up bridges and clumps of the fibers 2 at two different levels in the hopper 140. Depending on the size of the hopper 140, additional or fewer arms may be included to provide control over the formation of clumps and bridges within the hopper 140.

Since numerous modifications and combinations of the above method and embodiments will readily occur to those skilled in the art, it is not desired to limit the invention to the exact construction and process shown and described above.

For example, the invention can readily be used to deliver other lightweight material than the fibers 2. Further, numerous materials and fabrication methods can be used to fabricate the components described above and any examples of materials and fabrication methods are provided for illustration only and not as limitations to the invention. Accordingly, resort may be made to all suitable modifications and equivalents that fall within the scope of the invention as defined by the claims which follow. The words "comprise," "comprises," "comprising," "include," "including," and "includes" when used in this specification and in the following claims are intended to specify the presence of stated features or steps, but they do not preclude the presence or addition of one or more other features, steps, or groups thereof.

What is claimed is:

1. A material feed apparatus for rapidly delivering an amount of lightweight, friable mesh fibers, comprising:
   a hopper including an inlet for receiving and holding the mesh fibers and an outlet for dispensing the received mesh fibers;
   a drive assembly, contacting at least a portion of an outer surface of said hopper, for rotating said hopper about the central axis of said hopper at a rotation rate; and
   a vacuum conveyor assembly including a fiber inlet adjacent said outlet of said hopper and an air inlet upstream of said fiber inlet, said vacuum conveyor assembly being adapted to produce a vacuum at said outlet to draw the mesh fibers discharged from said hopper through a vacuum conveyor conduit connected to said fiber inlet, whereby the mesh fibers are maintained in a substantially compact state in said vacuum conveyor conduit by said vacuum to limit damage of the mesh fibers during conveyance.

2. The material feed apparatus of claim 1, wherein said vacuum conveyor assembly includes a venturi aspirator and a blower device to develop said vacuum at said outlet of said hopper.

3. The material feed apparatus of claim 2, wherein said fiber inlet is perforated to create a second air inlet for said vacuum conveyor assembly.

4. The material feed apparatus of claim 3, wherein said vacuum conveyor assembly further includes a pressurized air inlet connected to said air inlet.

5. The material feed apparatus of claim 2, wherein said venturi aspirator and blower device are selected such that the measurable amount of the mesh fibers is in the range of about 5 pounds per minute to about 15 pounds per minute.

6. The material feed apparatus of claim 5, wherein said vacuum conveyor conduit has a length as measured between said outlet of said hopper and said venturi aspirator in the range of about 50 feet to 100 feet.

7. The material feed apparatus of claim 1, wherein said rotation rate of said hopper is in the range of about 15 revolutions per minute to about 35 revolutions per minute.

8. The material feed apparatus of claim 1, wherein said hopper has a frustoconical shape.

9. The material feed apparatus of claim 8, wherein said hopper includes a fiber guide mounted to said inner surface adjacent said outlet to form a spiral path for guiding the mesh fibers downward in said hopper toward said outlet of said hopper.

10. The material feed apparatus of claim 9, further including a fiber-clearing blade fabricated from flexible material, said fiber-clearing blade being mounted to a stationary support rod positioned along the central axis of said hopper and positioned within said hopper to abuttingly contact a lower surface of said spiral fiber guide.

11. The material feed apparatus of claim 10, wherein said fiber-clearing blade is substantially planar and is mounted on said support rod to be traverse to the central axis of said support rod.

12. The material feed apparatus of claim 10, further including an upper blade fabricated from flexible material, said upper blade being mounted to said stationary support rod with at least a portion of said upper blade above said spiral fiber guide.

13. The material feed apparatus of claim 12, wherein said hopper further includes an upper blade guide rigidly mounted to said inner surface, said upper blade guide being positioned and configured to contact said upper blade during said rotation of said hopper to guide said upper blade to a point above said spiral fiber guide.

14. A material feed apparatus for delivering lightweight, friable mesh fibers with minimal damage to the mesh fibers, comprising:
   a hopper including an inlet for receiving and holding the mesh fibers, an outlet for dispensing the received mesh fibers, and a spiral fiber guide mounted to an inner surface of said hopper adjacent said outlet for guiding the mesh fibers;
   a drive assembly, contacting at least a portion of an outer surface of said hopper, for rotating said hopper about the central axis of said hopper at a rotation rate to facilitate movement of the mesh fibers from said inlet to said outlet of said hopper;
   a support assembly including a plurality of hopper supports contacting and vertically supporting said hopper, said hopper supports including bearing surfaces adapted to allow said rotation of said hopper; and
   a blade assembly for guiding the mesh fibers and clearing said spiral fiber guide including a fiber-clearing blade fabricated from flexible material, said fiber-clearing blade being mounted to a support rod rigidly mounted to said support assembly, and wherein said fiber-clearing blade is substantially planar and mounted transverse to an axis of said support rod to contact a lower surface of said spiral fiber guide during each rotation of said hopper.

15. The material feed apparatus of claim 14, wherein said blade assembly further includes an upper blade fabricated from flexible material, said upper blade being mounted to said support rod with at least a portion of said upper blade above said spiral fiber guide.

16. The material feed apparatus of claim 15, wherein said blade assembly further includes a rigid agitation arm mounted on said support rod, said agitation arm extending from said support rod to point adjacent said inner surface of said hopper.

17. The material feed apparatus of claim 15, wherein said hopper further includes an upper blade guide mounted to said inner surface, said upper blade guide being positioned and configured to contact said upper blade during said rotation of said hopper to guide travel of said upper blade to remain above an upper surface of said spiral fiber guide.

18. The material feed apparatus of claim 15, wherein at least a portion of said spiral fiber guide extends outward from said inner surface past said outlet of said hopper.

19. The material feed apparatus of claim 14, wherein said drive assembly comprises a support and drive rail connected to an outer surface of said hopper, a drive wheel positioned in abutting contact with said rail, and means for rotating said drive wheel.

20. A material feed apparatus for selectively providing a measurable amount of lightweight, friable mesh fibers, comprising:
   a structural support assembly;
   a frustoconical-shaped hopper mounted on said structural support assembly including an inlet for receiving mesh fibers and an outlet for dispensing the received mesh fibers;
   a drive assembly in contact with said hopper for rotating said hopper about the central axis of said hopper at a rotation rate; and
   a metered feed assembly mounted on said structural support assembly adjacent and above said inlet of said hopper, said metered feed assembly including a rotatable feed drum with an inlet-outlet opening, means for rotating said feed drum, and a feed bin for storing the mesh fibers positioned above said rotatable feed drum and in sealable contact with said feed drum;
   wherein said feed drum is rotated by said rotation means to position said inlet-outlet opening substantially upward to receive mesh fibers from an outlet of said feed bin and to position said inlet-outlet opening substantially downward to dispense the received mesh fibers to said inlet of said hopper.

21. The material feed apparatus of claim 20, wherein said metered feed assembly includes a hanger connected to said structural support assembly for supporting a mesh fiber bulk container above an inlet to said feed bin to supply mesh fibers to said feed bin.

22. The material feed apparatus of claim 20, wherein said feed drum is sized to receive and dispense the measurable amount of the mesh fibers during each of said rotations.

23. The material feed apparatus of claim 22, wherein said measurable amount is at least about 25 pounds of the mesh fibers.

24. The material feed apparatus of claim 20, further including a controller in communication with said drive assembly and said feed drum rotation means for selectively operating said drive assembly and said feed drum rotation means, wherein said structural support assembly further includes a sensing means for sensing the weight of said hopper and contents of said hopper and transmitting corresponding signals to said controller, and wherein said controller being adapted for operating said drive assembly and said feed drum rotation means in response to said signals from said sensing means to selectively provide said measurable amount.

* * * * *